(12) United States Patent
Hamada et al.

(10) Patent No.: US 8,243,806 B2
(45) Date of Patent: Aug. 14, 2012

(54) RECORDING AND REPRODUCING APPARATUS, SENDING APPARATUS AND TRANSMISSION SYSTEM

(75) Inventors: Koichi Hamada, Yokohama (JP); Muneaki Yamaguchi, Inagi (JP); Masahiro Kageyama, Hino (JP)

(73) Assignee: Hitachi, Ltd., Tokyo (JP)

( * ) Notice: Subject to any disclaimer, the term of this patent is extended or adjusted under 35 U.S.C. 154(b) by 1351 days.

(21) Appl. No.: 11/739,273

(22) Filed: Apr. 24, 2007

(65) Prior Publication Data

US 2007/0248331 A1 Oct. 25, 2007

(30) Foreign Application Priority Data

Apr. 24, 2006 (JP) .................................. 2006-18688

(51) Int. Cl.
*H04N 7/12* (2006.01)
*H04N 11/02* (2006.01)
(52) U.S. Cl. ................................................. 375/240.16
(58) Field of Classification Search ............. 375/240.16, 375/240.25, 240.26, E7.1, E7.031, E7.104, 375/E7.106; 386/112, 264
See application file for complete search history.

(56) References Cited

U.S. PATENT DOCUMENTS

| | | | | |
|---|---|---|---|---|
| 5,485,216 A | * | 1/1996 | Lee | 348/443 |
| 5,617,144 A | * | 4/1997 | Lee | 375/240.16 |
| 6,104,753 A | * | 8/2000 | Kim et al. | 375/240.16 |
| 6,128,435 A | * | 10/2000 | Galton | 386/241 |
| 6,983,019 B2 | * | 1/2006 | Yiwen et al. | 375/240.16 |
| 2002/0034247 A1 | * | 3/2002 | Sato et al. | 375/240.03 |
| 2003/0169933 A1 | | 9/2003 | Song et al. | |
| 2004/0223548 A1 | * | 11/2004 | Kato et al. | 375/240.16 |
| 2006/0119536 A1 | * | 6/2006 | Yoshida et al. | 345/1.1 |
| 2007/0009037 A1 | * | 1/2007 | Yamaguchi et al. | 375/240.16 |

FOREIGN PATENT DOCUMENTS

| | | |
|---|---|---|
| JP | 6-197331 | 7/1994 |
| JP | 09-037243 | 2/1997 |
| JP | 2001-145073 | 5/2001 |
| JP | 2003-274415 | 9/2003 |

* cited by examiner

*Primary Examiner* — Beemnet Dada
(74) *Attorney, Agent, or Firm* — Antonelli, Terry, Stout & Kraus, LLP.

(57) ABSTRACT

A video signal recording and reproducing apparatus is provided that is capable of reducing the encoding amount required for video recording thereby to record a longer video signal while suppressing deterioration of image quality when the video is displayed. An apparatus is also provided that is similarly capable of efficiently transmitting the video signal with a smaller transmission capacity during transmission of the video signal. A structure constituting the present invention comprises: a decoding unit which decodes an inputted video signal into video frames; a decimation unit which decimates the number of video frames decoded by the decimation unit; an encoding unit which encodes the video frames decimated by the decimation unit into encoded video signals; and a storage device which stores the video signals encoded by the encoding unit, wherein the decimation unit performs decimation for each video signal.

3 Claims, 5 Drawing Sheets

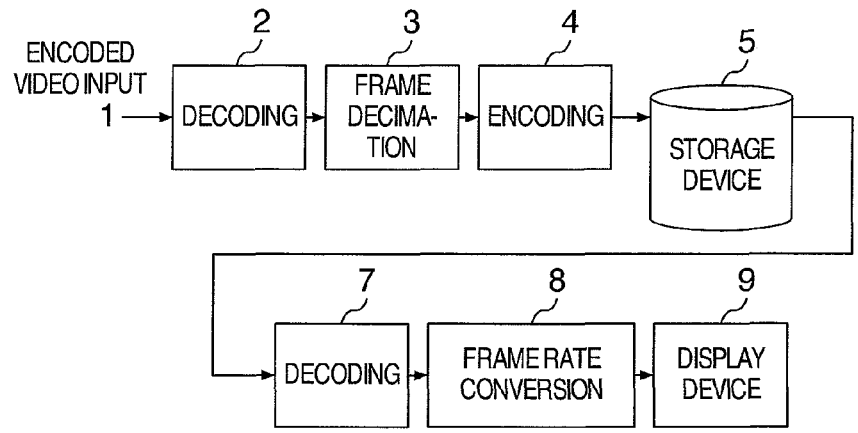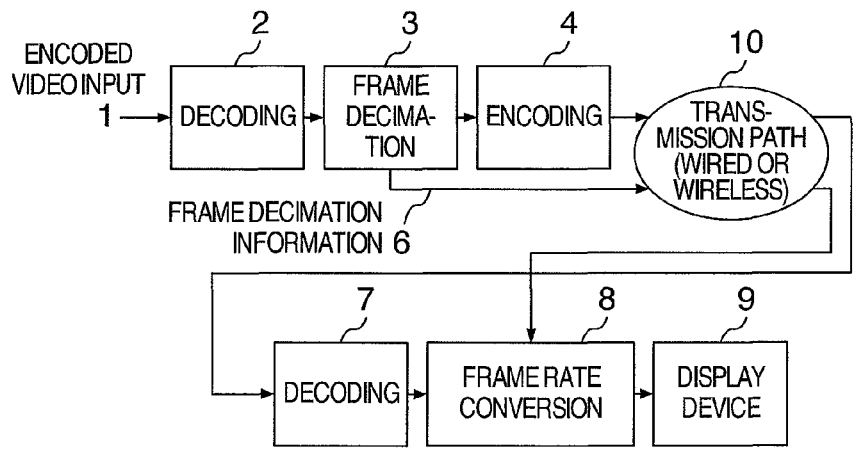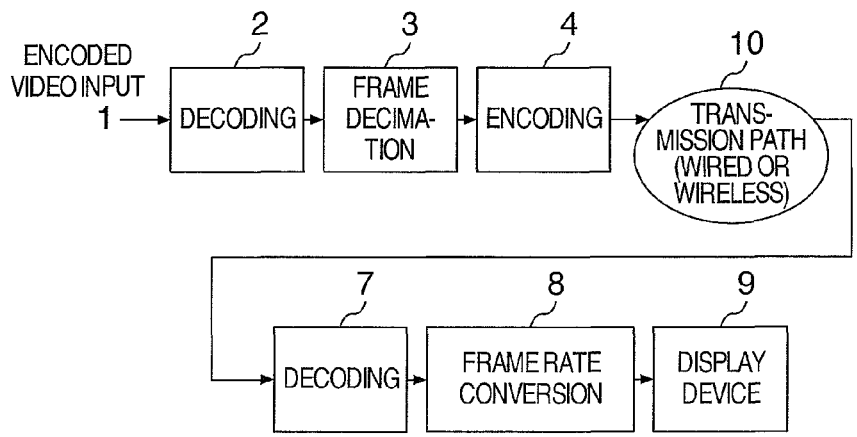

RECORDING AND REPRODUCING APPARATUS, SENDING APPARATUS AND TRANSMISSION SYSTEM

INCORPORATION BY REFERENCE

The present application claims priority from Japanese application JP2006-118688 filed on Apr. 24, 2006, the content of which is hereby incorporated by reference into this application.

BACKGROUND OF THE INVENTION

The present invention relates to a recording and reproducing apparatus which records and reproduces an encoded video signal, a sending apparatus which sends the encoded video signal, and a transmission system which transmits the encoded video signal.

Conventionally, there has been known technologies for performing decimation processing to an inputted digital video signal by frame skipping in the time direction to encode the processed digital video and interpolate decimated pixels during decoding.

In a Japanese Laid-open Patent Application JP-A-09-37243, as an example for the above, a technology is disclosed that enables the selection and outputting of a high-compression mode where encoding is performed after decimation processing or a normal mode where encoding is performed without the decimation processing being performed. This technology enables the selection between the high-compression and normal compression depending on the mode.

SUMMARY OF THE INVENTION

However, the decimation processing according to the above technology is performed at a decimation rate of a predetermined value. Therefor, when, for example, a highly dynamic video signal is inputted, a video that naturally should be displayed to continue to move is caused to stop, and thus image quality deterioration called a motion judder may occur.

It is an object of the present invention to provide an apparatus capable of reducing an encoding amount required for video recording to record a longer video signal while suppressing the image quality deterioration.

A recording and reproducing apparatus, as a structure that constitutes the present invention, comprises: a decoding unit which decodes an inputted video signal into a video frame; a decimation unit which decimates the number of video frames decoded by the decoding unit; an encoding unit which encodes the video frames that are decimated by the decimation unit into an encoded video signal; and a storage device which stores the encoded the video signal encoded by the encoding unit, wherein the decimation unit performs decimation for each video signal.

The present invention provides the apparatus that is capable of reducing the encoding amount required for video recording to record a longer video signal while suppressing the image quality deterioration.

BRIEF DESCRIPTION OF THE DRAWINGS

These and other features, objects and advantages of the present invention will become more apparent from the following description when taken in conjunction with the accompanying drawings wherein:

FIG. 3 is a block diagram showing an exemplary recording and reproducing apparatus according to an embodiment 2 of the present invention;

FIG. 4 is a block diagram sowing an exemplary video transmission and display device according to an embodiment 3 of the present invention;

FIG. 5 is a block diagram showing an exemplary video transmission and display device according to an embodiment 4 of the present invention;

DESCRIPTION OF THE EMBODIMENTS

Embodiments of the present invention will be described with reference to the accompanying drawings.

Embodiment 1

A video encoding scheme such as MPEG-2 or MPEG-4 is widely known as a method of performing transmission and recording.

In an embodiment of the present invention, a method is provided that uses the video encoding scheme to increase the compression rate of the video signal.

Figure 1:
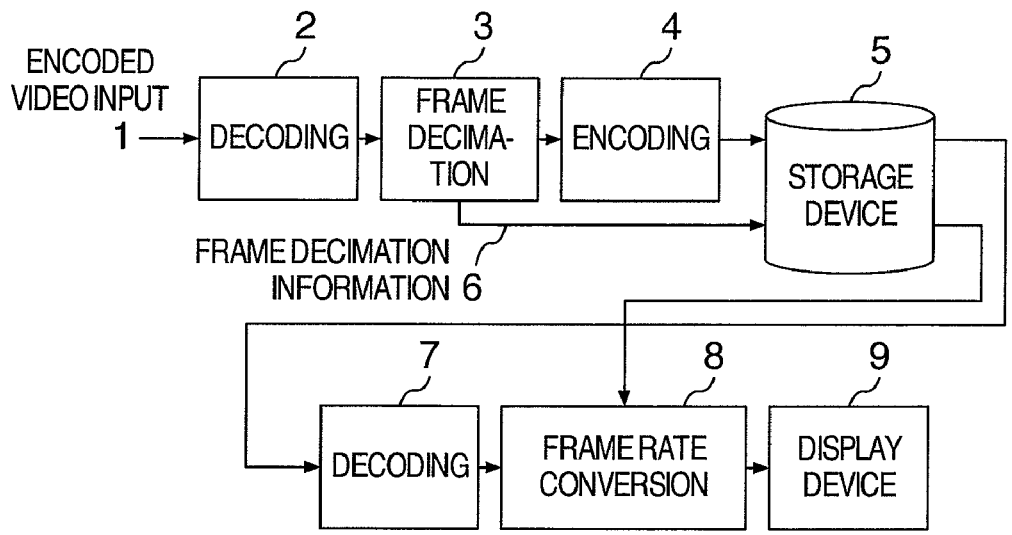
FIG. 1 is a block diagram showing an exemplary recording and reproducing apparatus according to an embodiment 1 of the present invention.

The recording and reproducing apparatus that employs the present invention will be described with reference to FIG. 1. An encoded video signal 1 which is created using the encoding scheme such as, for example, MPEG-2 is decoded into a video frame by a video signal decoding unit 2. The number of frames of the video signal which is decoded into a video frame status is decimated by a frame decimation unit 3.

The decimation of the number of frames is performed at different decimation rates for each inputted video signal.

The video frame in which video frames therein are decimated is encoded into a video signal again by an encoding device 4 and stored in a storage device 5. The video encoding scheme used by the encoding device 4 may be the same as or different from that employed in the encoded video input 1.

Since the encoding device 4 encodes the video in which video frames therein are decimated, it is expected the video encoding by the encoding device 4 can be performed with less encoding amount than the encoding of the video signal input 1 in which video frames are not decimated.

Which video frames are decimated by the frame decimation unit 3 is also stored in the storage device 5 as frame decimation information 6 just like the case with the video signal. The frame decimation information 6 may be stored in multiplex with the encoded video signal or may be separately stored.

When reproducing and displaying the stored video signal, the encoded video signal is read from the storage device 5, and is decoded into video frame information using a decoding device 7. The frame decimation information 6 is read from the storage device at the same time when the encoded video signal is read, and the video frames that are decimated by the frame decimation unit 3 are recovered by a frame rate converting device 8 and displayed by a display device 9.

The frame rate converting device 8 preferably employs a correction type frame rate conversion device that detects a motion vector of each frame of the video signal to estimate and create from the detected motion factor video frames that do not actually exist. This enables the estimation and creation of the video frames even if video frames are not actually transmitted after the decimation processing unit 3 decimates many video frames in the time direction. Therefore, it is possible to reduce the encoding amount required for video recording while preventing the deterioration of the video.

Figure 2:
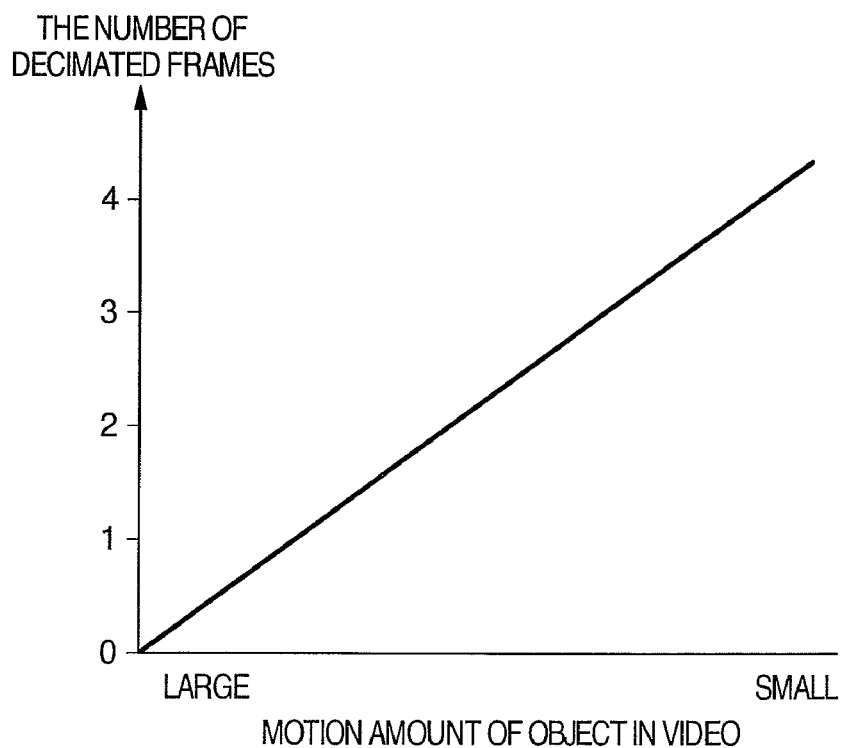
FIG. 2 is a diagram showing the number of frames decimated relative to the amount of motion of an object in a video.

Next, the processing by the above frame decimation unit 3 will be described. The frame decimation unit 3 performs decimation processing at a different decimation rate for each input video signal. Moreover, the frame decimation unit 3, for example, detects a characteristic of a video signal such as a frame motion vector of an inputted video signal or the number of individual objects in motion to perform processing accordingly. FIG. 2 shows the number of decimated frames relative to the motion amount of an object in a video. As FIG. 2 shows, when the motion amount of the object in a video is small, frame interpolation is likely performed correctly, and thereby a large number of frames are decimated. When the motion amount of the object in the video is large, frame interpolation is not likely performed correctly, and thereby a small number of frames are decimated. This enables minimizing the encoding amount required for the video recording while preventing the deterioration of the video after the frame is rate-converted. FIG. 2 shows an example in which the relationship between the motion amount of the object and the number of decimated frames is presented in a linear form. However, the present invention is not limited thereto. The relationship may naturally be presented in a nonlinear form or may be presented in a stair case form.

The decimation processing may also be performed in consideration of the decimation characteristic of a subsequent frame rate converting device 8. For example, a selection may adaptively be made in the following manner by providing a threshold. for a video which is easily frame-interpolated by the capability of the frame rate converting device 8, a large number of frames are decimated, while for a video which is not easily frame-interpolated by the frame rate converting device 8, a small number of frames are decimated or no frame is decimated.

Embodiment 2

An embodiment 2 of the recording and reproducing apparatus employing the present invention will be described with reference to FIG. 3. In FIG. 3, a frame decimation device 3 decimates a previously determined percentage of video frames. Moreover, a frame rate converting device 8 interpolates a previously determined percentage of video frames.

For example, the frame decimation device 3 acts to decimate half of the video frames, and the frame rate converting device 8 acts to double the number of video frames. FIG. 3 differs from FIG. 1 in that the frame decimation information 6 is not included in FIG. 3.

Embodiment 3

A video transmitting and displaying apparatus that employs the present invention will be described with reference to FIG. 4. FIG. 4 is identical to FIG. 1 only except that a transmission path 10 is disposed instead of the storage device 5 of FIG. 1. The transmission path 10 may be wired or wireless.

An encoded video signal 1 which is created employing an encoding scheme such as, for example, MPEG-2 is decoded by a video signal decoding unit 2 into a video frame. The number of frames of the video signal which is decoded into a video frame state is decimated by a frame decimation unit 3.

For the decimation of the number of frames, the number of frames to be decimated may be varied according to the motion vector of the inputted video signal, or may be varied according to the characteristic of a subsequent frame rate converting unit 8. Selection may be adaptively made in the following manner. for a video which is easily frame-interpolated by the frame rate converting unit 8, a large number of frames are decimated, while for a video which is not easily frame-interpolated by the frame rate converting unit 8, a small number of frames are decimated or no frame is decimated.

The video frame in which video frames therein are decimated is encoded into a video signal again by the encoding device 4 and is transmitted via a transmission path 10. The video encoding scheme used by the encoding device 4 may be the same as or different from that employed in the encoded video input 1.

Information on which video frames are decimated by the frame decimation unit 3 is transmitted as frame decimation information 6 via the transmission path 10 as is the case with the video signal. The frame decimation information 6 may be transmitted in multiplex with the encoded video signal or may be transmitted separately.

When reproducing and displaying the transmitted video signal, the encoded video signal is read through the transmission path 10 and decoded into video frame information using a decoding device 7. Frame decimation information 6 is read through the transmission path 10 simultaneously with the encoded video signal, and the video frame decimated by the frame decimation 3 is decoded by a frame rate converting device 8 and is displayed by a display device 9.

Embodiment 4

An embodiment 4 of the video transmitting apparatus that employs the present invention will be described with reference to FIG. 5. In this embodiment, a frame decimation device 3 decimates a previously determined rate of video frames. Moreover, a frame rate converting device 8 interpolates the previously determined rate of video frames.

For example, the frame decimation device 3 acts to decimate half the number of frames, and the frame rate converting device 8 acts to double the number of video frames. FIG. 5 is identical to FIG. 4 except that the frame decimation information 6 of FIG. 4 is not required in FIG. 5.

Embodiment 5

Figure 6:
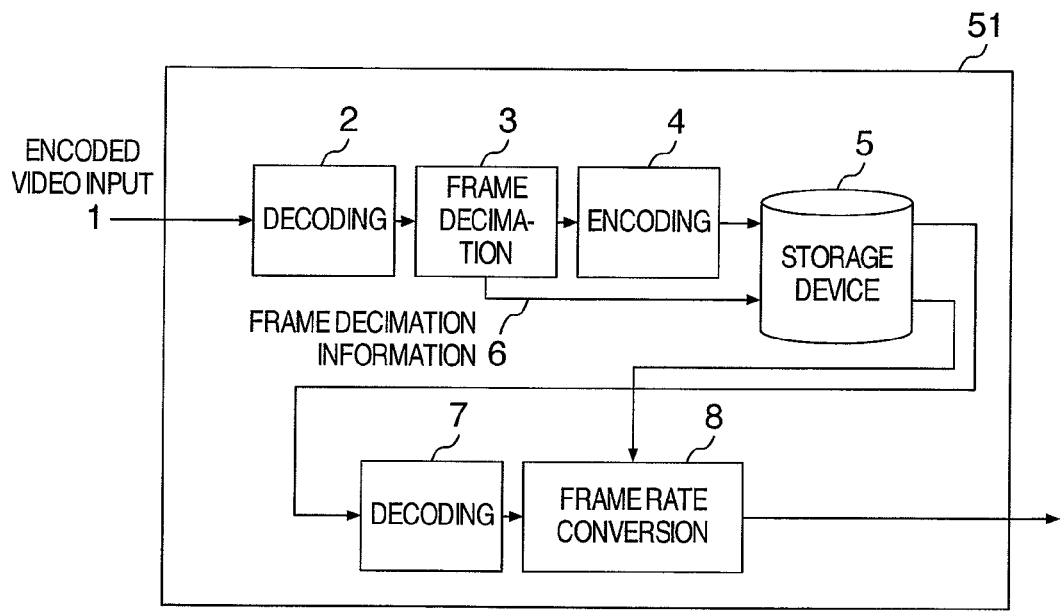
FIG. 6 is a block diagram showing an exemplary recording and reproducing apparatus according to an embodiment 5 of the present invention.

While structures having a display device have been described in the above embodiments 1 to 4, the present invention is not limited to the presence or absence of the display device. For example, FIG. 6 shows another embodiment of the recording and reproducing apparatus using the present invention. In FIG. 6, the video output of a frame converting device 8 is the output of the video storage and reproducing apparatus. A video recording and reproducing apparatus in which usability of the storage device 5 is improved can be implemented according to the same principle as the embodiment 1.

Embodiment 6

Figure 7:
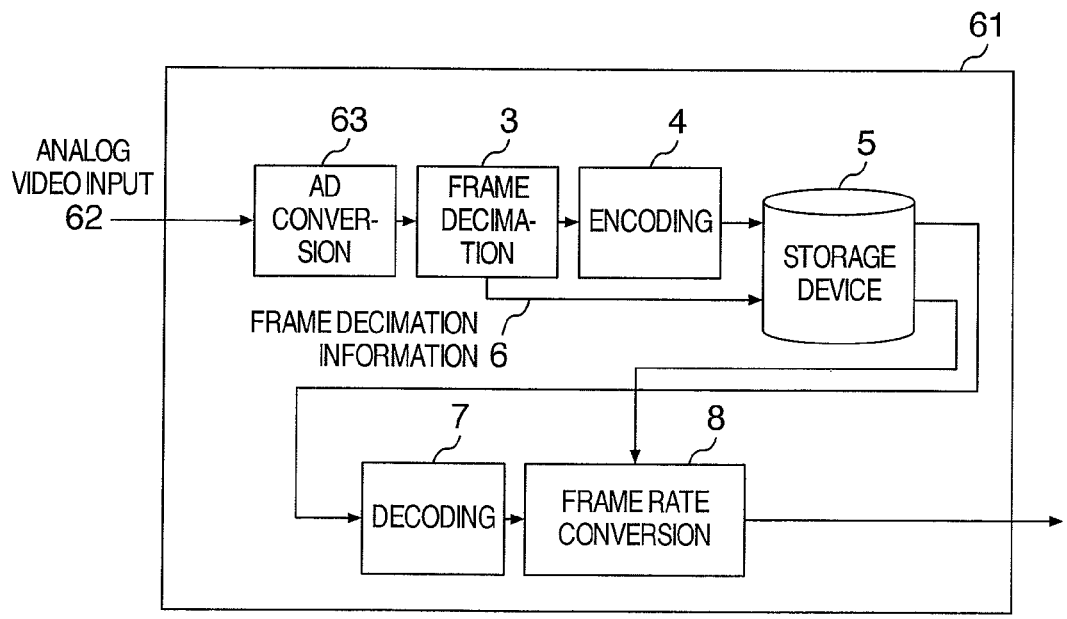
FIG. 7 is a block diagram showing an exemplary recording and reproducing apparatus according to an embodiment 6 of the present invention.

While an encoded video signal is inputted in the foregoing embodiments 1 to 5, the present invention is not limited to the encoded video signal input. FIG. 7 shows another embodiment of the recording and reproducing apparatus in which an analog video signal is inputted. For example, an analog video signal input 62 is converted by an analog to digital converting device 63 into a digitized video signal.

The decimation of the number of frames of the digitized video signal is performed at a frame decimation unit 3. The processing by the frame decimation unit 3 as well as subsequent processing can be performed in the same manner as the embodiment 1.

Embodiment 7

Figure 8:
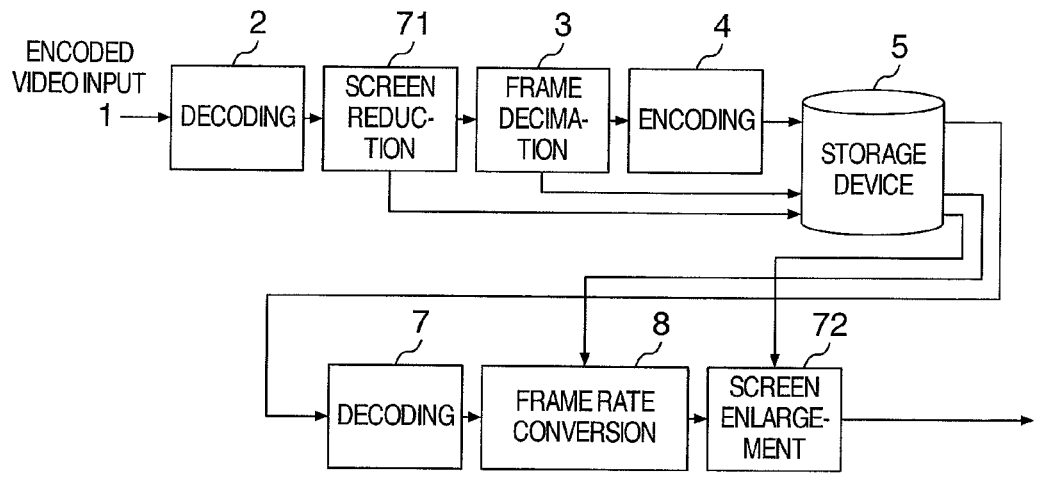
FIG. 8 is a block diagram showing an exemplary video storage and display device according to an embodiment 7 of the present invention.

FIG. 8 shows another embodiment of the recording and reproducing apparatus in which the amount of the video encoding to be stored is reduced. FIG. 8 shows a structure in which a screen reducing device 71 and a screen enlarging device 72 are added to the recording and reproducing apparatus shown in FIG. 7.

An encoded video signal 1 which is created using an encoding scheme such as, for example, MPEG-2 is decoded at a video signal decoding unit 2 into a video frame. The screen size of the decoded video frame is reduced by the screen reduction device 71.

The decimation of the number of frames of the reduced video signal is performed at the frame decimation unit 3.

The screen reduction rate may be varied according to the video frequency characteristic of the inputted video signal, or may be varied according to the characteristic of the subsequent screen enlarging device 72. For example, when only a low frequency component is contained in the inputted video signal, the screen reduction rate is increased, while when many large frequency components are included therein, the screen reduction rate is reduced. The reason is that when only a low frequency component is included in the inputted video signal, a satisfactory image quality would also be obtained through the enlargement processing performed by the subsequent screen enlarging unit 72. However, when many high frequency components are included therein, it would likely be difficult to obtain a satisfactory image quality even through the enlarging processing by the subsequent screen enlarging unit 72. The screen compression may also be performed at a fixed rate.

The video frame in which video frames thereof are decimated is video-encoded again by an encoding device 4 and stored in a storage device 5. The video encoding scheme used by the encoding device 4 may be the same as or different from that employed in encoding the video input 1.

Since the encoding device 4 encodes the video signal that has passed through the screen reduction device 71 and frame decimation device 3, it is expected that encoding by the encoding device 4 can be performed by a small amount of encoding compared with the encoding of the video signal 1.

Furthermore, screen reduction information of the screen reduction device 71 and frame decimation information 6 of the frame decimation device 3 are stored in a storage device 5 as is the case with video signal. These information may be stored in multiplex with the encoded video signal or may be stored separately.

When reproducing and displaying the stored video signal, the encoded video signal is read from the storage device 5 and is decoded into video frame information using the decoding device 7. The frame decimation information 6 is read from the storage device simultaneously with the encoded video signal, and the video frames decimated by the frame decimation device 3 are decoded by the frame rate converting device 8. After the screen size is enlarged by the screen enlarging device 72 at a rate reverse to the screen reduction, display is performed by a display device 9.

The order of the frame decimation device 3 and screen reducing device 71, and the order of the frame converting device 8 and screen enlarging device 72 may be reversed, respectively. The principle of the present embodiment is also applicable to the video transmitting apparatus. As a matter of course, it is also applicable to the recording and reproducing apparatus equipped with a display device.

Embodiment 8

Figure 9:
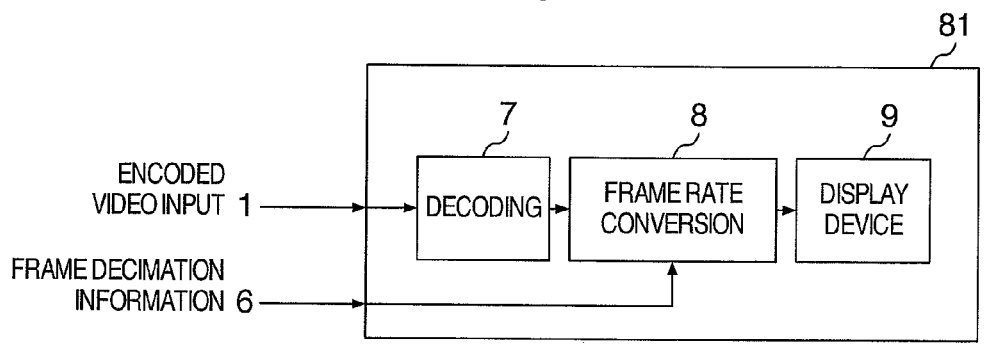
FIG. 9 is a block diagram showing an exemplary video display device according to an embodiment 8 of the present invention.

FIG. 9 shows another embodiment of the video display device according to the present invention. In addition to the encoded video signal 1, frame decimation information 6 is inputted to a frame rate converting device of a video display device 81.

When the frame decimation information 6 is not inputted, the frame rate conversion capability becomes ineffective, and the inputted encode video signal 1 is decoded and displayed at a display device 9.

When the frame decimation information 6 is inputted, frame decimation information based frame-interpolation is performed to the video frame which is decoded by a decoding device 7 and displayed at the display device 9.

Embodiment 9

Figure 10:
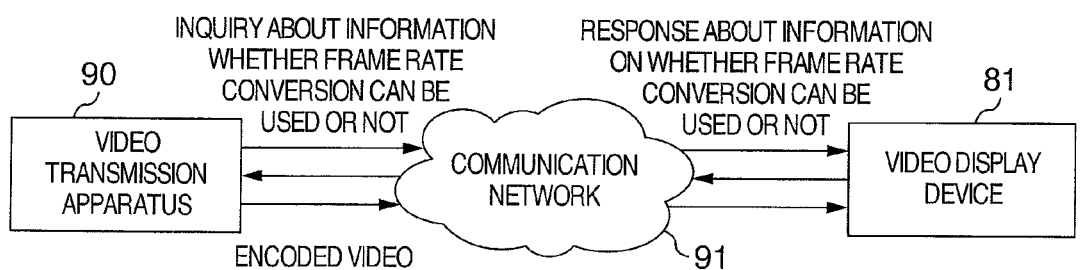
FIG. 10 is a diagram showing an example in which the recording and reproducing apparatus according to an embodiment of the present invention is used for a broadcasting that employs a communication network.

FIG. 10 shows an embodiment in which the present invention is applied to a broadcasting which employs a communication network.

A video transmission apparatus 90 transmits an encoded video signal to a video display device 81 via a network 91. The video transmission apparatus 90 inquires the video display device 81 about whether it is capable of using a frame rate converting capability in order to reduce occupancy of the communication network 91 to be used.

When the video display device is not capable of using the frame rate converting capability, the video transmission apparatus 90 transmits an encoded video in which frames are not decimated.

In contrast, when the video display device is capable of using the frame rate converting capability, the video transmission apparatus 90 uses the present invention to transmit an encoded video in which frames are decimated together with frame decimation information.

Furthermore, the information that is transmitted from the video display device to the video transmission apparatus is not limited to the information on whether the display device is capable of using the frame rate conversion or not. The information may also pertain to the specification of the frame rate converting unit.

The occupancy of the communication network 91 to be used can be more reduced when the video transmission apparatus 90 transmits the encoded video in which frames are decimated, thus making it possible to make effective use of the communication network 91.

Embodiment 10

Figure 11:
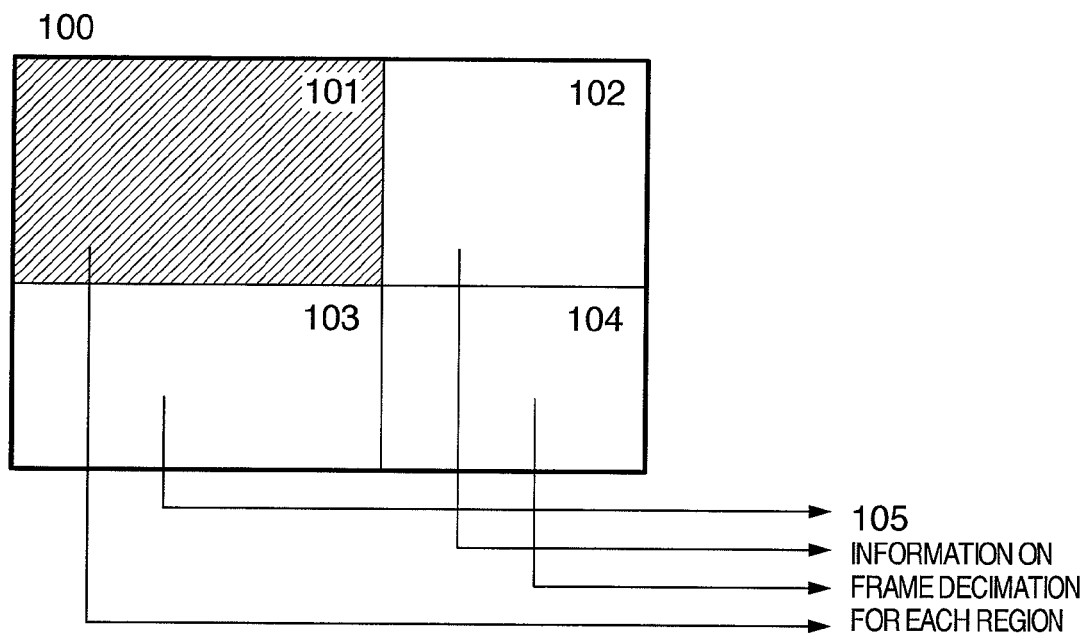
FIG. 11 is a diagram showing an example in which a video frame is separated into regions and frame decimation is performed for each region.

In all of the foregoing embodiments, the decimation of the number of frames has been described on the assumption that information on one entire video frame is decimated. However, as shown in FIG. 11, it is also conceivable that one video frame is divided into a plurality of regions, and decimation rate is varied for each region. In this case, it is required to transmit or store the frame decimation information for each region.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

The invention claimed is:

1. A recording and reproducing apparatus, comprising:
a first decoding unit which decodes an inputted video signal into a video frame;
a decimation unit which decimates the number of frames decoded by said decoding unit;
an encoding unit which encodes the video frame decimated by said decimation unit into an encoded video signal;
a storage device which stores the video signal encoded by said encoding unit;
a second decoding unit which decodes the video signal stored in said storage device; and
a motion correction type frame rate converting device which detects a motion vector of each frame of the video signal which is decoded by the second decoding unit and estimates and creates video frames from the detected motion vector;
wherein said decimation unit decimates a large number of frames when the motion amount of an object in the video is small, and decimates a small number of frames when the motion amount of an object in the video is large.

2. The recording and reproducing apparatus according to claim 1, wherein:
said frame rate converting device uses information on the decimation of the frame decimated by said frame decimation unit to convert the frame rate.

3. The recording and reproducing apparatus according to claim 2, further comprising:
a screen reducing unit which uses the video frequency characteristic of a video signal to reduce the screen of the video signal decoded by said decoding unit; and
a screen enlarging unit which enlarges the screen of a video signal which is frame-rate-converted by said frame rate converting device.

* * * * *